United States Patent
Csányi

(10) Patent No.: US 6,205,038 B1
(45) Date of Patent: Mar. 20, 2001

(54) CIRCUIT ARRANGEMENT FOR PROVIDING A UNIT RECOGNIZING SYSTEM COMBINED WITH ENERGY SUPPLY

(76) Inventor: László Csányi, OÖ193-95, E.II/9, H-1142 Budapest (HU)

( * ) Notice: Subject to any disclaimer, the term of this patent is extended or adjusted under 35 U.S.C. 154(b) by 0 days.

(21) Appl. No.: 09/394,329

(22) Filed: Sep. 13, 1999

Related U.S. Application Data

(63) Continuation of application No. PCT/HU98/00023, filed on Mar. 12, 1998.

(30) Foreign Application Priority Data

Mar. 17, 1997 (HU) .................................................. 97 00594

(51) Int. Cl.[7] ...................................................... H02J 1/02
(52) U.S. Cl. ................................................. 363/39; 363/47
(58) Field of Search ................................ 363/16, 34, 39, 363/47; 307/85

(56) References Cited

U.S. PATENT DOCUMENTS 4,737,657    4/1988    Jatko et al. .............................. 307/85
5,530,638  * 6/1996    Wu ......................................... 363/16

FOREIGN PATENT DOCUMENTS 0153072    8/1985    (EP).
2342600    9/1977    (FR).

OTHER PUBLICATIONS

Patent Abstract of Japan of JP 57199391 of Dec. 1982.

* cited by examiner

*Primary Examiner*—Jessica Han
(74) *Attorney, Agent, or Firm*—Ladas and Parry

(57) ABSTRACT

The invention relates to a circuit arrangement for providing a unit recognizing system combined with energy supply. The system includes a unit recognizer combined with energy supply (EE) and an energy source with variable frequency (FMG). The unit recognizing module combined with energy supply (EE) includes a supply block (3) and between this and the energy source with variable frequency (FMG) a further filter block (1) and a potential separating block (2).

4 Claims, 2 Drawing Sheets

Figure 1:
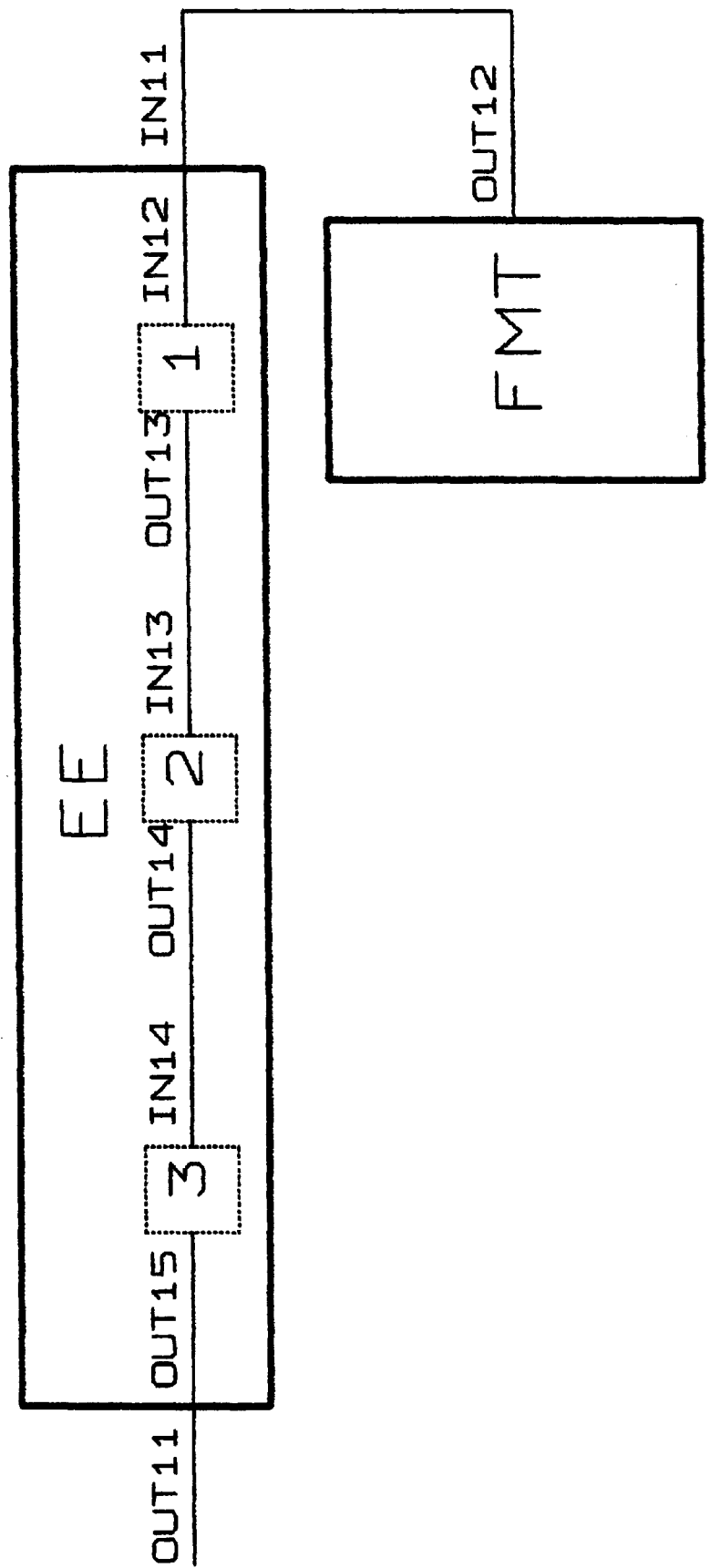

CIRCUIT ARRANGEMENT FOR PROVIDING A UNIT RECOGNIZING SYSTEM COMBINED WITH ENERGY SUPPLY

This application is a continuation of PCT/HU98/00023 filed Mar. 12, 1998.

The invention relates to a circuit arrangement for providing a unit recognizing system combined with energy supply. The system includes a unit recognizer combined with energy supply and an energy source with variable frequency. The unit recognizer combined with energy supply includes a unit recognizer filter, a potential separating circuit and a supply unit.

It is a usual task in the technical practice in measurement and control technologies to collect data from sensors and operational means installed far from one another, and to output, further to transmit the necessary commands. To achieve this task at least two conditions must be met. The first condition is to ensure energy supply for the operation, the second condition is to select the unit now interesting for us from the plurality of units. One of the most advantageous methods being the subsequent handling of measuring and operational units, the differencing between the units can be provided by separate wiring of units or by addressing the units connected on an identical information line. The task of addressing is usually achieved by various "BUS" systems. Such a method is the use of CAMAC. GPIB systems the common characteristic of which is the great speed and high definition given by digital data transmission. The spanning of relatively great distances demands a special cabling and line fitting, and further sophisticated electronics. Selection, that is addressing of the units, demands costly protection systems in an industrial environment loaded with noises of great energy. The costs of an implemented system are greatly increased by these circumstances. Because of the described drawbacks the above mentioned systems are not currently used.

The sufficient requirements of definition, punctuality and speed can be realized by measurement data collecting means based on industrial personal computers. Such means are the measurement data collecting means produced for example by NATIONAL INSTRUMENTS, ADVANTECH, KL ÖCKNER-MOELLER and several other firms. In case of greater measurement and operation distances there is a need of using signal conditioning means completed with line fitting means. When these means are radially arranged, they necessitate great cabling investments, and in the case of serial connection there is a need of addressing and data communication supplements to the above mentioned. As the energy level of signals is limited, the effect of noises in industrial environment cannot be neglected.

The common disadvantages propriety of the described solutions and of the methods embodying them is the necessity to provide a local energy supply for the signal conditioners in the case of great distances, or the energy transport demands costly investments in case of a radial arrangement. A further drawback is that the activation of the corresponding signal conditioner requires addressing techniques which in addition to the complicated solution further increase the costs. A further drawback is that the selection of the signal conditioners and the energy supply to them are two separate tasks. It is again understood that the fitting, installation and supply problems of signal communication between units installed in greater distances, one from another, exist against the rational means of a signal processing and commanding personal computer.

It is an object of the present invention to provide a unit recognizing, unit designating and energy supplying system which eliminates most of the drawbacks of the described solutions, is easily to install, requires minimal wiring, don't necessitate energy supply on the place of measurement and has good noise protection.

The present invention is based on the recognition that having a generator with variable frequency and connecting to it a plurality of signal conditioning and commanding units completed with a unit recognizing unit combined with an energy supply unit, only units with filters tuned on the frequency of the energy present on the energy supply line with the common variable frequency are provided with the energy necessary to their operation in the desired quantity. The so provided energy is brought preferably by potential separation and allocation of a supply unit to the form required to operate the circuits.

The essence of the present invention is to designate the selected unit and at the same time to provide it with the energy in the quality required for its operation by means of adjusting the frequency of variable frequency generator connected to the variable frequency energy line.

Figure 2:
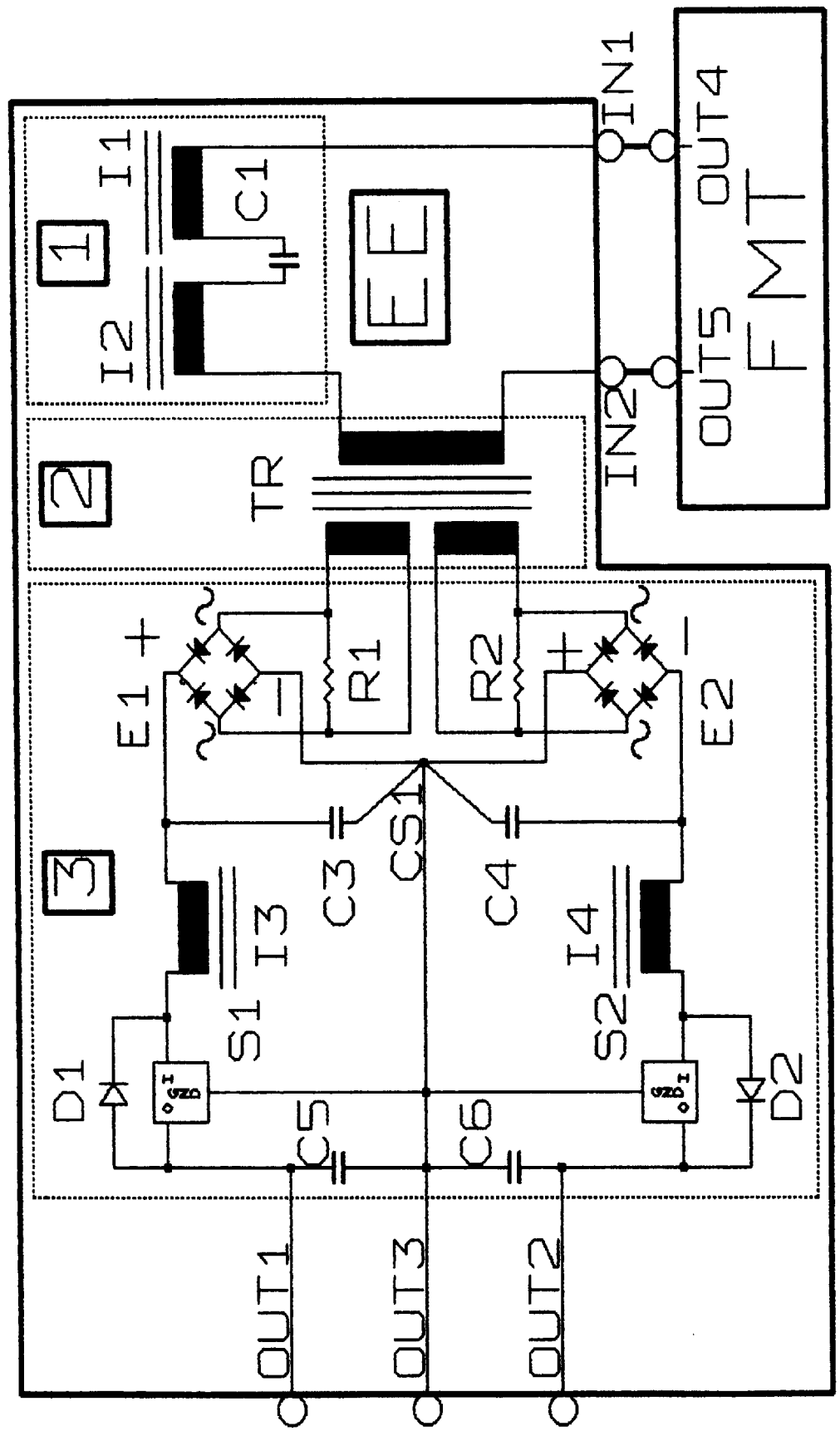

The circuit arrangement according to the present invention will be further described in detail with reference to the drawings, in which:

The circuit arrangement according to the present invention will be further described in detail with reference to the drawings, in which:

FIG. 1 shows the block scheme of the unit recognizing system combined with energy conversion according to the present invention, FIG. 2 shows a possible embodiment of the unit recognizing module combined with energy conversion according to the present invention.

The unit recognizing system combined with energy conversion according to the present invention will be disclosed with reference to FIG. 1. According to FIG. 1 the input IN11 of the unit recognizing module combined with energy conversion EE is connected to the output OUT12 of a frequency-modulated supply unit FMT.

The output OUT11 of the unit recognizing module combined with energy conversion EE is identical to the output OUT15 of supply block 3. Between the input IN11 of the unit recognizing module combined with energy conversion EE and the input IN14 of the supply block 3 there are a filter block 1 and a potential separating block 2 provided in series electrical connection. According to the invention these two blocks are commutative, their position can be changed with each other. In this latter case the input IN13 of the a potential separating block 2 is identical to input IN11, and its output OUT14 is connected to input IN12 of the filter block 1, while output OUT13 of which is connected to input IN14 of the supply block 3. The filter block 1 comprising at least one filter stage and including in each filter stage at least one filter element, and any of the elements can be a band pass filter or a low-pass filter or a high-pass filter or a band rejection filter.

The potential separating block 2 includes at least one transformer TR provided with at least one primary coil and at least one secondary coil. The supply block 3 includes at least one circuit generating and/or controlling a supply voltage. The supply block 3 is provided with at least one output OUT15 forming a common point with the output OUT11 of the unit recognizing module combined with energy conversion EE.

A possible embodiment of the invention will be disclosed with reference to FIG. 2. The filter block 1 in this arrangement comprises a modified band pass filter including a second inductance 12, a first capacitor C1 and a first inductance I1 connected in series. In the serial connection the free terminal of first inductance I1 is connected to the first terminal IN1 of the unit recognizing module combined with enversion EE there are connected to the primary terminal points of the transformer TR of the potential separating block 2, then one pair from two independent terminal pairs of the transformer of the potential separating block 2 is closed by means of the first resistor R1 of the supply block 3, said closed terminals are connected to the alternating current inputs~of the first rectifier E1 of the supply block 3, whereas the other secondary terminals of the transformer TR of the potential separating block 2 are closed by means of the second resistor R2 of the supply block 3, said closed terminals are connected to the alternating current inputs~of the second rectifier E2 of the supply block 3, then the negative point – of the first rectifier E1, the positive point + of the second rectifier E2, a point of the third capacitor C3, a point of the fourth capacitor C4, a point of the fifth capacitor C5 and a point of the sixth capacitor C6 form a common connection with the first node point CS1, the third output OUT3 of the unit recognizing module combined with energy conversion EE, the ground point of the first stabilizer S1 and the ground point of the second stabilizer S2, then one point of the third inductance I3, the other point of the third capacitor C3 and the positive point + of the first rectifier E1 are connected together, then the outer point of the third inductance I3, the input of the first stabilizer S1 and the cathode of the first diode D1 are connected together, whereas one terminal of the fourth inductance I4 forms a common connection with the other terminal of the fourth capacitor C4 and the negative point – of the second rectifier E2, then the other terminal of the fourth inductance I4 forms a common connection with the input of the second stabilizer S2 and the anode of the second diode D2, whereas the output of the second stabilizer S2, the cathode of the second diode D2, the other terminal of the sixth capacitor C6 and the second output OUT2 of the unit recognizing module combined with energy conversion EE form a common connection, and subsequently the output of the first stabilizer S1, the anode of the first diode D1, the other terminal of the fifth capacitor C5 form a common connection with the first output OUT1 of the unit recognizing module combined with energy conversion EE, which arrangement is completed by the connection of the inputs IN1, IN2 of the unit recognizing module combined with energy conversion EE and the outputs OUT4, OUT5 of the frequency-modulated supply unit FMT.

The unit recognizing system combined with energy conversion according to the present invention operates as follows.

The unit recognizing depends on two basic factors. First, the unit should be provided with the energy required for its operation from the frequency-modulated supply unit FMT. Second, the available energy should have a selectively detectable parameter. As described, the unit recognizing module combined with energy conversion EE can get energy then and during a time, when and during the time in which the frequency of the energy output by the frequency-modulated supply unit FMT is in the pass range of the filter block 1. The number of advantageous embodiments can be increased by combinations of further filter elements arranged in the filter block 1. The potential separating block 2 provides substantial advantages for the noise protection and the supply with more outputs respectively. The supply block 3 ensures the power supply of desired quality and having the parameters necessary to operation, and if the number of stabilizers in one block is increased as disclosed before, a broad range of demands can be met.

What is claimed is:

1. Circuit arrangement for providing a unit recognizing system combined with energy conversion comprising a unit recognizing module combined with energy conversion (EE) having an input connected to the output of at least one remote frequency-modulated supply unit (FMT) through an energy supply line, the unit recognizing module combined with energy conversion (EE) is comprising a supply block (3), the supply block (3) including at least a circuit generating and/or controlling a supply voltage, characterized in that between the input (IN) of the unit recognizing module combined with energy conversion (EE) and the input (IN) of the supply block (3) there are a filter block (1) and a potential separating block (2) provided in commutative series electrical connection, where the filter block (1) comprising at least one filter stage including at least one element in each filter stage, the element being a band pass or a low-pass or a high-pass or a band rejection filter element, and the potential separating block (2) is including at least one transformer (TR) provided with at least one primary coil and at least one secondary coil.

2. The circuit arrangement of claim 1 characterized in that said filter block (1) comprises a modified band pass filter including a second inductance (I2), a first capacitor (C1) and a first inductance (I1) connected in series, and in said serial connection the free terminal of first inductance (I1) is connected to the first terminal (IN1) of the unit recognizing module combined with energy conversion (EE), whereas between the free terminal of second inductance (I2) and the second terminal (IN2) of the unit recognizing module combined with energy conversion (EE) there are connected the primary terminal points of the transformer (TR) of the potential separating block (2), then one pair from two independent terminal pairs of the transformer (TR) of the potential separating block (2) is closed by means of the first resistor (R1) of the supply block (3), said closed terminals are connected to the alternating current inputs (~) of the first rectifier (E1) of the supply block (3), whereas the other secondary terminals of the transformer (TR) of the potential separating block (2) are closed by means of the second resistor (R2) of the supply block (3), said closed terminals are connected to the alternating current inputs (~) of the second rectifier (E2) of the supply block (3), then the negative point (−) of the first rectifier (E1), the positive point (+) of the second rectifier (E2), a point of the third capacitor (C3), a point of the fourth capacitor (C4), a point of the fifth capacitor (C5) and a point of the sixth capacitor (C6) form a common connection with the third output (OUT3) of the unit recognizing module combined with energy conversion (EE), the ground point of the first stabilizer (S1) and the ground point of the second stabilizer (S2), then one point of the third inductance (I3), the other point of the third capacitor (C3) and the positive point (+) of the first rectifier (E1) are connected together, then the other point of the third inductance (I3), the input of the first stabilizer (S1) and the cathode of the first diode (D1) are connected together, whereas one terminal of the fourth inductance (I4) forms a common connection with the other terminal of the fourth capacitor (C4) and the negative point (−) of the second rectifier (E2), then the other terminal of the fourth inductance (I4) forms a common connection with the input of the second stabilizer (S2) and the anode of the second diode (D2), whereas the output of the second stabilizer (S2), the cathode of the second diode (D2), the other terminal of the sixth capacitor (C6) and the second output (OUT2) of the unit recognizing module combined with energy conversion (EE) form a common connection, and subsequently the output of the first stabilizer (S1), the anode of the first diode (D1), the other terminal of the fifth capacitor (C5) form a common connection with the first output (OUT1) of the unit recognizing module combined with energy conversion (EE), and the inputs (IN1, IN2) of the unit recognizing module combined with energy conversion (EE) are in connection with outputs (OUT1, OUT2) of the frequency-modulated supply unit (FMT).

3. A unit-recognizing and energy conversion unit comprising:

a filter for selecting by passing or rejecting a signal from a supply line, whereby the unit is recognized, and a potential separator including at least one transformer in commutative series electrical connection with the filter, whereby one of the filter and potential separator is connected to the supply line and the other of the filter and potential separator is in series with the one thereof; and a power supply responsive to the other of the filter and potential separator, whereby to provide power from the recognized unit.

4. In a system having devices connected to a supply line, the improvement for selecting and powering one of the devices wherein the one of the devices includes a unit-recognizing and energy conversion unit comprising:

a filter for selecting by passing or rejecting a signal from the supply line, whereby the unit is recognized, and a potential separator including at least one transformer in commutative series electrical connection with the filter, whereby one of the filter and potential separator is connected to the supply line and the other of the filter and potential separator is in series with the one thereof; and a power supply responsive to the other of the filter and potential separator, whereby to provide power to the one device from the recognized unit.

* * * * *